United States Patent Office 3,786,137
Patented Jan. 15, 1974

3,786,137
PREPARATION OF ULTRA-PURE COMPOUNDS CORRESPONDING TO THE FORMULA CaAl$_2$O$_4$ AND MgAl$_2$C$_4$
Ian M. Thomas, Temperance, Mich., assignor to Owens-Illinois, Inc.
No Drawing. Continuation of abandoned application Ser. No. 40,721, May 26, 1970. This application Apr. 7, 1972, Ser. No. 242,260
Int. Cl. C01f 7/16
U.S. Cl. 423—600          5 Claims

ABSTRACT OF THE DISCLOSURE

Double metal alkoxides of the formula $M[Al(OR)_4]_2$ are converted by pyrolysis, or hydrolysis and pyrolysis, to ultra-pure compounds corresponding to the formula $MAl_2O_4$ wherein M is magnesium or calcium and R is an alkyl group containing from 1 to 7 carbon atoms.

CROSS-REFERENCES

The application is a continuation of U.S. Ser. No. 40,721, filed May 26, 1970, now abandoned.

THE INVENTION

This invention generally relates to the preparation of fine particulate ultrapure oxide products including compositions corresponding to the spinel formula $MgO \cdot Al_2O_3$ or $MgAl_2O_4$. More particularly, this invention relates to a novel method of preparing high purity oxide products from double alkoxide compositions.

Spinel, having the formula $MgAl_2O_4$, or alternatively $MgO \cdot Al_2O_3$, is normally prepared, according to the prior art, by heating stoichiometric quantities of the individual oxides, that is, MgO and $Al_2O_3$, to at least approximately 1200° C. for several hours, to form the crystalline, comparatively large, particle size spinel composition. In this method of preparing spinel, it will be readily apparent that errors in weighing and impurities in the starting oxides lead to nonstoichiometry and the final product is consequently not pure spinel. Another similar method involves the mixing of magnesium hydroxide and aluminum hydroxide purportedly in the stoichiometric quantity to produce the spinel composition followed by a decomposition of these hydroxides to produce the final oxide product. The same problems, that is, impurities in the hydroxides as well as errors in weighing, also lead to nonstoichiometry in the final product as well as a product which is contaminated. An alternative method involves the coprecipitation of an aqueous solution of magnesium and aluminum chlorides in an aqueous base and, again, the same difficulties exist; that is, the stoichiometry is entirely dependent upon the weighing accuracy and the purity level is generally poor because of the contaminants in the starting materials.

The uses and properties of spinel as well as the desirability of having a pure spinel are known in the prior art. In this regard, reference may be had to Ceramic Oxides, E. Ryshkewitch (Academic Press, 1960) and to U.S. Pat. No. 2,805,167, respectively. Unfortunately, however, an ultrapure stoichiometric spinel composition has not been attainable by prior art techniques.

With the foregoing in mind, it is an object of this invention to produce ultrapure metal oxide compositions by employing double alkoxides of the type $M[Al(OR)_4]_2$.

Another object of this invention is to prepare an ultra-high purity amorphous oxide composition of extremely small particle size which corresponds to the formula $MgAl_2O_4$.

Yet another object of this invention is to form a crystalline spinel.

Still another object of this invention is to provide a method for converting double alkoxides of the formula $M[Al(OR)_4]_2$ to ultrapure oxides corresponding to the formula $MAl_2O_4$.

The foregoing objects and other advantageous features will be readily apparent to those skilled in the art from the following description of the invention.

As contemplated in a preferred aspect of the present invention, double alkoxides of magnesium and aluminum of the type represented by the formula $Mg[Al(OR)_4]_2$, or alternatively as $MgAl_2(OR)_8$, are advantageously employed in the production of oxide compositions corresponding to the formula $MgAl_2O_4$, or $MgO \cdot Al_2O_3$. These double alkoxides are highly advantageous because of the fact that they are single compounds which are easily prepared and which are readily purified to an ultrapure state as, for example, by evaporation under vacuum. Additionally, the atomic ratio of magnesium and aluminum in these compounds is exactly the same as that in spinel-type compositions ($MgAl_2O_4$) and, consequently, ultimate conversion of these double alkoxide compounds to oxide products corresponding to the formula $MgAl_2O_4$, results in exact stoichiometry in addition to extremely high purity. With regard to the manner of preparing these double alkoxides, reference may be had to my copending application, Ser. No. 40,702, entitled "Double Alkoxides," filed the same date as the present invention, and which is hereby incorporated by reference.

The conversion of the double alkoxide to the desired oxide product is effected by a pyrolysis (thermal degradation) step or by a hydrolysis step which is followed by a pyrolysis step. In the pyrolysis technique, all that is necessary is that the double alkoxide be heated to a temperature in excess of that at which it pyrolyzes to the pure oxide product, corresponding to the formula $MgAl_2O_4$. Generally, heating to a temperature in excess of about 250° C. to 300° C., preferably in the range of about 250° C. to 800° or 900° C., is sufficient with a holding period for a time sufficient to allow for the complete decomposition to the pure oxide product. Most desirably, the heating is effected in an oxygen atmosphere in which case a combined thermal and oxidative degradation occurs. Hereinafter, the term "pyrolysis" comprehends thermal degradation with or without oxygen.

The pyrolysis step may be either a vapor type decomposition or a bulk type decomposition. Vapor pyrolysis may be effected within a matter of seconds, for example, two to three seconds, and bulk pyrolysis, depending on the amount of material, may be done in about one-half hour to several days, and, more generally, in about two or three hours to about twenty-four or twenty-five hours. In the alternative technique of a combined hydrolysis and pyrolysis, the amount of water employed may be sufficient to completely hydrolyze the $MgAl_2(OR)_8$ compound or it may be less than that required for complete hydrolysis, i.e. only partial hydrolysis is effected. Whether complete or partial, the product of hydrolysis is isolated and pyrolyzed by heating to form a compound corresponding to the formula $MgAl_2O_4$.

Hydrolysis may be thought of as proceeding by the following equation wherein the double alkoxide is represented as $MgAl_2(OR)_8$, the R group being a $C_1$ to $C_7$ alkyl group.

$$MgAl_2(OR)_8 + xHOH \rightarrow MgAl_2(OR)_{8-x}(OH)_x + xROH$$

wherein $x$ represents the number of equivalents of water used for hydrolysis.

The foregoing equation represents a simplified, illustrative equation only, inasumch as the exact structure of the reaction product is not known with absolute certainty. The reaction product may be thought to include one or more of monomeric species, one of which is represented in the equation and polymeric species derived from these. Accordingly, the formula $MgAl_2(OR)_{8-x}(OH)_x$ is intended to include these various species which are the reaction products of water and the double alkoxides of the type noted above. If $x$ is zero, obviously no hydrolysis is effected, in which case the product $MgAl_2(OR)_8$ is pyrolyzed to the compound corresponding to the formula $MgAl_2O_4$. To obtain complete hydrolysis, $x$ will be 8 or more, whereas if $x$ is between 0 and 8, only partial hydrolysis will be effected; the resulting partially or completely hydrated products (hydrates) are subsequently converted to the oxide corresponding to the formula $MgAl_2O_4$. Even when $x$ is 8 or more, complete hydrolysis may not be effected unless an elevated temperature or catalyst is employed. Temperatures in excess of about 100° C. or so are generally sufficient for complete hydrolysis and basic catalysts, such as $NH_3$, organic amines are suitable.

These double alkoxides are preferably substantially completely hydrolyzed, that is, at least six of the eight alkoxy groups of the double alkoxide have been removed, and most desirably, at least seven, with water to produce a reaction product which may be thermally decomposed to compounds corresponding to the spinel formula $MgAl_2O_4$.

In an especially highly preferred practice of this invention, the double alkoxide is dissolved in an inert solvent and water is added thereto, whereby the hydrated magnesium and aluminum composition will precipitate in extremely small particle size, that is, particles on the order of approximately 20 to about 150, and more typically, 50 to about 100 angstrom units (A). Because of the hydrate formation being accomplished by the decomposition of single compounds containing both magnesium and aluminum, the hydrate reaction product may in reality be a single hydrate or an intimate mixture of mixed magnesium and aluminum hydrate.

After the precipitate is formed by partial or substantially complete hydrolysis, it is separated and pyrolyzed to a compound corresponding to the formula $MgAl_2O_4$. The separation may be effected by solvent evaporation such as spray drying, flaking or the like or by filtration.

While it is generally preferred that water be added to the double alkoxide solution, the reverse procedure may also be employed. That is, the double alkoxide may be added to vigorously stirred water. In either instance, room temperature water is conveniently employed but water at other temperatures may also be employed. When the double alkoxide solution is added to water, however, the product is, after filtration and drying, harder and more granular than when the reverse procedure is used. This tendency to form a harder, more granular product can be minimized, however, by using an organic diluent in the water and preferably a water miscible diluent, such as the $C_1$ to $C_4$ aliphatic alcohols like methanol, ethanol, isopropanol, and n-butanol. Mixtures of about equi-parts to about 5 or 6 parts alcohol per part water (volume) and preferably 4 parts alcohol per water are quite effective.

The final product corresponding to the formula $MgAl_2O_4$ as contemplated in this invention will generally contain less than about 200 p.p.m. by weight of impurities and no more than 400–500 p.p.m. The amount of alkali metal oxide impurities, for example, will be less than 5 parts per million.

While the R group of the alkoxide group of the double alkoxides may be a $C_1$ to $C_7$ alkyl, it is generally preferred that the R group contain between two and seven carbon atoms inasmuch as these double alkoxides are more volatile than when the double alkoxide is of the methoxide structure. Most advantageously, however, the alkoxide group will be the secondary butoxy group because this double alkoxide is a liquid which is easily distilled. $Mg[Al(sec-OBu)_4]_2$ or, alternatively,

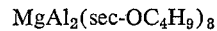

has a boiling point, for example, of about 140° C. at 0.1 mm. of mercury.

The solvent in which the double alkoxide is hydrolyzed will advantageously be an aliphatic or cyclic organic solvent, including alicyclic and aromatic compositions. Preferably, the solvent is inert and most desirably, the solvent is an inert non-polar hydrocarbon such as the $C_4$ or $C_5$ to about the $C_{20}$ or $C_{30}$ alkanes, and most desirably, $C_5$ to $C_{13}$ alkanes, including straight, branched and cyclic alkanes like n-heptane, n-hexane, n-hexadecanes, cyclohexane, isopropylcyclohexane, 1 - methyl - 3 - ethylcyclopentane. Other suitable solvents include: esters of the formula R—COOR wherein R is a $C_1$–$C_7$ alkyl including methyl acetate, ethyl acetate, ethyl formate, isopropyl buturate and the like; ethers of the formula R—O—R wherein R is a $C_1$–$C_7$ alkyl including diethylether, diamylether, ethylamylether and the like; ketones of the formula R—CO—R wherein R is $C_1$–$C_7$ alkyl including methyl ethyl ketone, 3-methyl butanone and the like; halogenated hydrocarbons, for example, ethylene chloride, methylene chloride, tetrachloroethylene, mono-di- and tri-chlorobenzene and the like. If desired, the solvent may be an alcohol, e.g., a $C_1$–$C_{20}$ alcohol but as will be recognized, an alcohol interchange reaction may take place with the double alkoxide. Isopropanol, n-hexanol, n-decanol, and the like are suitable. Aromatics and alkyl substituted aromatics of the formulae

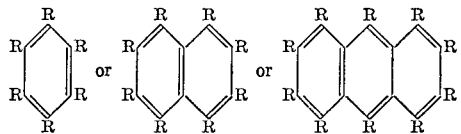

and the like wherein each R is independently selected from H or $C_1$–$C_{30}$ alkyl, and preferably from H or $C_1$–$C_7$ alkyls; benzene, toluene, zylene, and similar arenes are suitable. Other similar solvents will readily be selected such as mineral spirits, petroleum spirits, kerosene, and the like.

The substantially completely hydrolyzed reaction product of the double alkoxide and water may be heated to form either an amorphous product corresponding to the spinel formula $MgO \cdot Al_2O_3$ or a crystalline product, i.e., spinel, of the formula $MgO \cdot Al_2O_3$. When heated to a non-crystallizing temperature, that is, a temperature generally less than about 900 to 1000° C., to produce an amorphous product corresponding to the formula $MgO \cdot Al_2O_3$ or $MgAl_2O_4$, a particulate product is obtained. This product when photographed with an electron microscope shows the product to be comprised of agglomerates of individual particles having a size generally less than about 300 angstrom units. Additionally, as determined by the Brunauer-Emmett-Teller method described in the Journal of the American Chemical Society, vol. 60, page 309 (1938) with krypton being used as the absorbing gas, the surface area of this particulate product is generally in the range of about 20–25 to about 500–1000 square meters per gram or even more. The preferred temperature range for forming the amorphous composition corresponding to the formula $MgO \cdot Al_2O_3$ is generally in the range of about 400 or 500° C. to about 800 or 900° C. Temperatures in excess of about 900–1000° C. may be employed to produce the crystalline spinel product. When so crystallized, the particulate product is, in general, characterized by an increase in particle size with less agglomeration and by a reduction in surface area relative to the amorphous product.

The following examples are illustrative of the manner of practicing this invention, it, of course, being understood that the examples are not to be construed as limiting the invention but merely set forth as exemplary of the manner of using the invention.

Example 1

Into approximately 500 ml. of normal heptane, there was dissolved approximately 132 grams of Mg[Al(sec-OC$_4$H$_9$)$_4$]$_2$ (equivalent to approximately 28.5 grams of MgAl$_2$O$_4$). The solution was placed in a Waring Blender and approximately 30 ml. (28.6 ml.=8 equivalents) of triple distilled water was added dropwise with vigorous stirring over a period of about 20 minutes. After the addition was complete (the temperature had increased from room temperature to about 45° C.), the white, extremely small particle size (50 to about 100 angstrom units) solid precipitate was filtered off and dried at about 110° C. for approximately 16 hours. The resulting dry, fluffy white product weighed approximately 39.8 grams. The dried product was then processed in a laboratory ball mill for approximately three hours to break up the agglomerates.

Example 2

The same charge of heptane and double alkoxide as in Example 1 was placed in a Waring Blender and water in aliquots corresponding to one equivalent (3.6 ml.) were added. After each addition, the mixture was allowed to settle and a small portion (2–3 ml.) of the clear heptane layer was removed. Water was added to the clear material to check for further precipitation. After 5 equivalents were added, precipitation was still incomplete; however, on the addition of the sixth, the mixture was thick and clear sample of heptane solution could not be removed. The mixture was filtered at this stage and water added to the filtrate. No further precipitation resulted, thus indicating that under these conditions about 6 equivalents are sufficient to precipitate quantitatively the magnesium and aluminum in the system.

Example 3

The fine white powdered product as produced in Example 1 was then heated slowly, that is, in a period of about 2 to 3 hours to a temperature of about 500° C. and held at that temperature for about 1 hour. At this stage the product weighed approximately 26.4 grams and had a surface area of approximately 408 square meters per gram as determined by the Brunauer-Emmett-Teller method previously mentioned and X-ray analysis showed the material to be amorphous.

An elemental analysis showed the product to be 28.3% (wt.) MgO and 71.5% Al$_2$O$_3$ whereas the theoretical values for a compound of the formula MgAl$_2$O$_4$ is 28.3% MgO and 71.7% Al$_2$O$_3$. An emission spectrographic analysis showed the following impurities in the MgAl$_2$O$_4$ product in parts by weight.

Fe, 7 p.p.m.
Mn, 27 p.p.m.
Ti, 43 p.p.m.
Si, 58 p.p.m.
Be, N.D. (less than 1 p.p.m.)
B, N.D. (less than 3 p.p.m.)
Ge, N.D. (less than 10 p.p.m.)
Pb, N.D. (less than 3 p.p.m.)
Cr, N.D. (less than 3 p.p.m.)
Sn, N.D. (less than 10 p.p.m.)
Sb, N.D. (less than 30 p.p.m.)
Bi, N.D. (less than 10 p.p.m.)
V, N.D. (less than 3 p.p.m.)
Mo, N.D. (less than 1 p.p.m.)
Cu, N.D. (less than 3 p.p.m.)
Ag, N.D. (less than 3 p.p.m.)
Zr, N.D. (less than 10 p.p.m.)
Ni, N.D. (less than 10 p.p.m.)
Co, N.D. (less than 10 p.p.m.)
Zn, N.D. (less than 30 p.p.m.)
As, N.D. (less than 100 p.p.m.)

N.D. means not detected at the limit shown in parentheses. By flame photometer the alkali was found to be less than 2–3 p.p.m. Na$_2$O with Li$_2$O and K$_2$O not detected (latter two are therefore less than 2 p.p.m. of each).

Example 4

Further heating of the product from Example 3 to a temperature of about 800° C. and holding it at that temperature for approximately one to one and one-half hours caused a reduction in the surface area of the product to about 240 square meters per gram but the powder remained amorphous by X-ray analysis. An electron photomicrograph at this stage showed the product to be comprised of agglomerates of individual particles having a particle size of approximately 100 to about 150 angstrom units in diameter.

Example 5

Further heating of the product of Example 4 to a temperature of about 1000° C. with a holding period of approximately one and one-half hours caused crystallization to spinel. X-ray analysis showed sharp peaks corresponding to spinel only and there was no evidence of any free crystalline MgO or Al$_2$O$_3$. Additionally, the surface area was reduced to about 26 square meters per gram and the particle size generally increased to the range of about 200 to about 300 angstrom units with less agglomeration being noted.

Example 6

Pellets were pressed from the material produced from Example 4 in a mold at approximately 20,000 pounds hydrostatic pressure and at room temperature. These pellets were of high strength and had a specific gravity of about 0.89. After sintering at 1420° C. overnight, a non-porous, crystalline, translucent MgAl$_2$O$_4$ product was produced having a specific gravity of approximately 3.3 (theory is 3.59). When heated to higher temperatures, the specific gravity of the crystallized spinel composition will more closely approach the theoretical value. The impurities in the product were the same as those set forth in Example 2.

Example 7

1.000 gram of the clear, colorless liquid $$MgAl_2(sec\text{-}OC_4H_9)_8$$

was then hydrolyzed with about 2 ml. of water in a platinum crucible, and then slowly heated to a temperature of about 800° C. and held at that temperature for a time sufficient to remove all combined and uncombined water to thereby produce a calcined oxide product. When analyzed 0.216 gram of a composition corresponding to the formula MgO.Al$_2$O$_3$ or MgAl$_2$O$_4$ was obtained from the hydrolysis of the colorless liquid alkoxide. In contrast, the theoretical amount of a product corresponding to the formula MgO.Al$_2$O$_3$ or MgAl$_2$O$_4$ is 21.5 percent based on a compound of the formula $$MgAl_2(sec\text{-}OC_4H_9)_8$$

In lieu of using the magnesium-containing double alkoxide, that is, double alkoxides of the formula $$Mg[Al(OR)_4]_2$$

Ca[Al(OR)$_4$]$_2$ may likewise be employed in the same manner resulting in an oxide product corresponding to the formula CaAl$_2$O$_4$. Both the Ca and Mg double alkoxides may be decomposed to the oxides and used as refractory materials. Thus, there is contemplated in this invention the conversion of a compound of the formula M[Al(OR)$_4$]$_2$ or MAl$_2$(OR)$_8$, wherein M is an alkaline earth metal having an atomic weight between about 24.3 and about 40.1 and wherein OR designates an alkoxy group having between 1 and 7 carbon atoms, preferably between 2 and 7 carbon atoms, and, most advantageously, OR will be the secondary butoxy group, to compounds corresponding to the formula $MAl_2O_4$ wherein M is as set forth above and will be either calcium or magnesium.

It will be understood that in accordance with the provisions of the patent statutes, modifications and variations of the present invention may be made without departing from the spirit and scope thereof.

I claim:

1. A method for forming a high purity product containing less than about 5 parts per million of alkali metal oxide impurities, said product consisting of a compound corresponding to the formula $MAl_2O_4$ wherein M is an alkaline earth metal having an atomic weight between about 24.3 and 40.1, said method consisting essentially of:
   (a) adding a compound of the formula $M[Al(OR)_4]_2$, wherein R is a $C_1$-$C_7$ alkyl, to an organic solvent to form a solution,
   (b) combining said solution with at least about 6 equivalents of water so as to quantitatively precipitate a solid reaction product,
   (c) separating said solid reaction product from step (b) by filtration,
   (d) drying the filtered product of step (c),
   (e) ball milling the product of step (d) so as to break up agglomerates in the product,
   (f) heating the product of step (e) to a temperature of less than about 900° C. so as to produce a small particle size amorphous form of said high purity product having a surface area of about 20 to about 1,000 square meters per gram.

2. The method of claim 1 wherein said compound of the formula $M[Al(OR)_4]_2$ is a liquid compound with OR being a secondary butoxy group and wherein M is Mg.

3. The method of claim 5 wherein said solution is combined with about 6 equivalents of water.

4. The method of claim 1 wherein in excess of 8 equivalents of water are employed.

5. The method of claim 1 and further including the step of further heating the product of step (d) in an excess of about 900° C. for a time sufficient to convert said product to a pure crystalline form.

References Cited
UNITED STATES PATENTS

| | | | |
|---|---|---|---|
| 3,510,272 | 5/1970 | Schmank et al. | 423—600 |
| 3,413,083 | 11/1968 | Daendliker | 423—600 X |
| 3,509,057 | 4/1970 | Greger | 423—600 |
| 1,689,356 | 10/1928 | Meerwein | 423—600 UX |
| 2,805,167 | 9/1957 | McCreight et al. | 423—600 |
| 3,544,266 | 12/1970 | Palmour et al. | 423—600 |
| 2,948,628 | 8/1960 | Warner. | |

FOREIGN PATENTS

| | | |
|---|---|---|
| 569,081 | 1/1959 | Canada. |

HERBERT T. CARTER, Primary Examiner

UNITED STATES PATENT OFFICE
CERTIFICATE OF CORRECTION

Patent No. 3,786,137  Dated January 15, 1974

Inventor(s) Ian M. Thomas

It is certified that error appears in the above-identified patent and that said Letters Patent are hereby corrected as shown below:

In the Title, the formula "$MgAl_2C_4$" should read --$MgAl_2O_4$--.

Column 1, line 18, the formula reading "$Mal_2O_4$" should read --$MAl_2O_4$--.

Column 3, line 2, "inasumch" should read --inasmuch--.

Column 4, line 41, "zylene" should read --xylene--.

Column 8, line 6 (Claim 3), "5" should read --2--.

Signed and sealed this 9th day of July 1974.

(SEAL)
Attest:

McCOY M. GIBSON, JR.
Attesting Officer

C. MARSHALL DANN
Commissioner of Patents